(12) United States Patent
Gunderson

(10) Patent No.: US 6,894,608 B1
(45) Date of Patent: May 17, 2005

(54) SYSTEM AND METHOD FOR WARNING OF POTENTIAL COLLISIONS

(75) Inventor: Richard A. Gunderson, Eden Prairie, MN (US)

(73) Assignee: Altra Technologies Incorporated, Eden Prairie, MN (US)

( * ) Notice: Subject to any disclaimer, the term of this patent is extended or adjusted under 35 U.S.C. 154(b) by 0 days.

(21) Appl. No.: 09/621,748

(22) Filed: Jul. 21, 2000

Related U.S. Application Data

(60) Provisional application No. 60/145,156, filed on Jul. 22, 1999.

(51) Int. Cl.[7] ................................................. B60Q 1/26
(52) U.S. Cl. ..................... 340/468; 340/471; 340/475; 340/425.5
(58) Field of Search ................................ 340/468, 469, 340/471, 475, 478, 435, 436, 437, 425.5; 701/300, 301

(56) References Cited

U.S. PATENT DOCUMENTS

| | | | |
|---|---|---|---|
| 3,707,708 A | 12/1972 | Dan ........................ | 340/213.2 |
| 3,797,309 A | 3/1974 | Joy et al. ................... | 73/194 B |
| 3,891,966 A | 6/1975 | Sztankay .................... | 340/53 |
| 3,978,481 A | 8/1976 | Angwin et al. ......... | 343/7 VM |
| 4,056,761 A | 11/1977 | Jacoby et al. ............... | 318/116 |
| 4,072,945 A | 2/1978 | Katsumata et al. ...... | 343/7 VM |
| 4,104,632 A | 8/1978 | Fujiki et al. ............. | 343/7 VM |
| 4,125,826 A | 11/1978 | Rasmussen et al. .......... | 340/63 |
| 4,146,891 A | 3/1979 | Fujiki et al. ............ | 343/77 VM |
| 4,148,028 A | 4/1979 | Fujiki ............................ | 343/7 |
| 4,158,841 A | 6/1979 | Wuchner et al. ......... | 343/7 VM |
| 4,162,488 A | 7/1979 | Silverman et al. .......... | 340/505 |
| 4,204,096 A | 5/1980 | Barcus et al. ........... | 179/146 R |
| 4,308,536 A | 12/1981 | Sims, Jr. et al. ......... | 343/7 VM |
| 4,379,497 A | 4/1983 | Hainsworth et al. ........ | 180/168 |
| RE31,509 E | 1/1984 | Neidell ....................... | 343/9 R |
| 4,489,321 A | 12/1984 | Hoffa et al. .................... | 343/8 |
| 4,528,563 A | 7/1985 | Takeuchi ..................... | 340/903 |
| 4,537,271 A | 8/1985 | Ito et al. ..................... | 180/131 |
| 4,546,840 A | 10/1985 | Yukishige et al. .......... | 180/169 |
| 4,580,251 A | 4/1986 | Koukovinis ................. | 367/140 |
| 4,612,530 A | 9/1986 | Kurth .......................... | 340/63 |
| 4,679,175 A | 7/1987 | Eder et al. .................... | 367/98 |
| 4,681,431 A | 7/1987 | Sims et al. .................... | 356/4 |
| 4,692,764 A | 9/1987 | Bonar ......................... | 342/71 |
| 4,737,788 A | 4/1988 | Kennedy ..................... | 342/29 |
| 4,759,063 A | 7/1988 | Chaum ........................ | 380/30 |
| 4,759,064 A | 7/1988 | Chaum ........................ | 380/30 |
| 4,815,046 A | 3/1989 | Dorr ........................... | 367/95 |
| 4,823,042 A | 4/1989 | Coffey et al. ............... | 310/322 |

(Continued)

FOREIGN PATENT DOCUMENTS

| | | | | |
|---|---|---|---|---|
| DE | 197 02 688 | 7/1998 | ......... | B60R/161/02 |
| EP | 009959 | 10/1997 | ......... | G01S/13/93 |
| WO | 95/01890 | 1/1995 | ............ | B60Q/1/00 |
| WO | 99/42856 | 8/1999 | ........... | G01S/13/93 |

OTHER PUBLICATIONS

Blind–Sight Product Brochure, (May 7, 1996).
Sonar Safety Systems Product, (1996).
ECCO Scan Product Literature, (1996).

(Continued)

*Primary Examiner*—Jeffery Hofsass
*Assistant Examiner*—Daniel Previl
(74) *Attorney, Agent, or Firm*—Schwegman, Lundberg, Woessner & Kluth, P.A.

(57) ABSTRACT

A collision avoidance system for a vehicle. The collision avoidance system includes one or more transmitting devices, one or more receiving devices, a control module and a mirror. The receiving devices receive return signals and send information regarding the return signals to the control module. The control module detects a hazard based on the information received from the one or more receiving devices. The mirror includes visual indicators for warning a driver of the hazard detected by the control module.

21 Claims, 13 Drawing Sheets

U.S. PATENT DOCUMENTS

| | | | |
|---|---|---|---|
| 4,920,520 A | 4/1990 | Gobel et al. | 367/99 |
| 4,943,796 A * | 7/1990 | Lee | 340/435 |
| 4,953,141 A | 8/1990 | Novak et al. | 367/108 |
| 5,029,290 A | 7/1991 | Parsons et al. | 340/533 |
| 5,059,946 A | 10/1991 | Hollowbush | 340/435 |
| 5,091,726 A | 2/1992 | Shyu | 340/904 |
| 5,153,559 A | 10/1992 | Atsumi | 340/435 |
| 5,181,011 A | 1/1993 | Okano | 340/438 |
| 5,212,467 A | 5/1993 | Park | 340/435 |
| 5,229,975 A | 7/1993 | Truesdell et al. | 367/107 |
| 5,235,316 A | 8/1993 | Qualizza | 340/436 |
| 5,249,163 A | 9/1993 | Erickson | 367/149 |
| 5,251,188 A | 10/1993 | Parsons et al. | 367/140 |
| 5,286,099 A | 2/1994 | Fujita et al. | 303/103 |
| RE34,773 E | 11/1994 | Dombrowski | 340/904 |
| 5,373,482 A | 12/1994 | Gauthier | 367/99 |
| 5,389,912 A | 2/1995 | Arvin | 340/435 |
| 5,418,359 A | 5/1995 | Juds et al. | 250/221 |
| 5,424,747 A | 6/1995 | Chazelas et al. | 342/70 |
| 5,455,557 A | 10/1995 | Noll et al. | 340/431 |
| 5,465,079 A | 11/1995 | Bouchard et al. | 340/576 |
| 5,471,215 A | 11/1995 | Fukuhara | 342/70 |
| 5,483,501 A | 1/1996 | Park et al. | 367/140 |
| 5,485,892 A | 1/1996 | Fujita | 180/167 |
| 5,517,197 A | 5/1996 | Algeo et al. | 342/70 |
| 5,528,217 A | 6/1996 | Adams | 340/435 |
| 5,541,891 A | 7/1996 | Waldmann et al. | 367/99 |
| 5,572,428 A | 11/1996 | Ishida et al. | 364/461 |
| 5,574,426 A | 11/1996 | Shisgal et al. | 340/435 |
| 5,581,464 A | 12/1996 | Woll et al. | 364/424.04 |
| 5,583,479 A | 12/1996 | Hettich et al. | 340/426 |
| 5,587,938 A | 12/1996 | Hoetzel | 364/578 |
| 5,635,922 A | 6/1997 | Cho et al. | 340/903 |
| 5,668,739 A | 9/1997 | League et al. | |
| 5,670,935 A | 9/1997 | Schofield et al. | 340/461 |
| 5,684,474 A | 11/1997 | Gilon et al. | 340/903 |
| 5,712,640 A | 1/1998 | Andou et al. | 342/70 |
| 5,714,928 A | 2/1998 | Sudo et al. | 340/436 |
| 5,714,947 A | 2/1998 | Richardson et al. | 340/903 |
| 5,734,336 A * | 3/1998 | Smithline | 340/903 |
| 5,749,984 A | 5/1998 | Frey et al. | 152/415 |
| 5,767,793 A * | 6/1998 | Agravante et al. | 340/903 |
| 5,825,286 A | 10/1998 | Coulthard | 340/447 |
| 5,917,666 A * | 6/1999 | Kimble | 359/838 |
| 5,929,786 A * | 7/1999 | Schofield et al. | 340/903 |
| 6,111,683 A * | 8/2000 | Cammenga et al. | 340/468 |
| 6,154,149 A * | 11/2000 | Tyckowski et al. | 340/903 |
| 6,184,781 B1 | 2/2001 | Ramakesavan | 340/435 |
| 6,198,409 B1 * | 3/2001 | Schofield et al. | 340/903 |
| 6,225,918 B1 | 5/2001 | Kam | 340/903 |
| 6,250,783 B1 * | 6/2001 | Stidham et al. | 340/475 |
| 6,268,803 B1 | 7/2001 | Gunderson et al. | 340/903 |
| 6,339,369 B1 | 1/2002 | Paranjpe | 340/436 |
| 6,421,081 B1 | 7/2002 | Markus | 348/148 |

OTHER PUBLICATIONS

"Driver's Manual for the CL–400 Reverse Parking Aid", *TICI Software Systems Ltd. and Silcon Heights Ltd.,* In: Rechovot, Israel, 1–9, (Jun. 1997).

Benites, E., "A Demonstration of Multisensor Tracking", *Naval Weapons Center,* China Lake, CA, 307–311.

Blackman, S.S., *Multiple—Target Tracking with Radar Applications,* Artech House, Inc., Norwood, MA, pp. 98–107, 280–299, (1986).

* cited by examiner

SYSTEM AND METHOD FOR WARNING OF POTENTIAL COLLISIONS

This application claims benefit of application Ser. No. 60/145,156 filed on Jul. 22, 1999.

BACKGROUND OF THE INVENTION

1. Field of the Invention

The present invention relates generally to sensor-based systems, and more particularly to a vehicle-mounted collision avoidance system which warns drivers of potential collisions.

2. Background Information

The roads are becoming more and more congested with vehicular traffic. As traffic congestion has increased, the number of accidents has also increased. Some of these accidents can be traced to driver inattentiveness or to the failure of the driver or of other drivers to see and react to surrounding vehicles.

Muth Mirror Systems of Sheboygan, Wis. manufactures a side view mirror with a built-in turn signal display (a "chevron"). The side view mirror can be mounted on both the passenger and driver sides of the vehicle and includes light emitting diodes (LEDs) which blink in time to the turn signal. The chevron is designed to be clearly visible to drivers in the lane adjacent to the host vehicle.

Such a display is good for warning drivers of adjacent vehicles. It does little, however, to warn the driver of the host vehicle of potential collisions.

Systems for warning drivers of objects external to their vehicle have been around for a long time. Mirrors, and sometimes combinations of mirrors, are being used to reveal locations hidden to the driver's view (i.e. "blind spots"). Mirrors, however, have a deficiency in that the driver can only look in one spot at any one time, and no one mirror can provide a complete view of all the possible blind spots. If they look in one mirror, see that the way is clear, start looking elsewhere and then a vehicle pulls into the area they thought was clear, they won't see it and may run into the vehicle. For example, if the driver looks at the lane adjacent to the vehicle, sees that the way is clear, starts looking elsewhere and then a vehicle pulls along side, the driver won't see it and may clip the vehicle while changing lanes.

In addition, mirrors don't work well in changing lanes, particularly in tractor-trailer rigs. One reason is that a side view mirror only looks in the lane adjacent to the vehicle and to the rear of the side view mirror. Vehicles forward of the side view mirror or more than one lane away from the vehicle may be missed. In addition, as soon as the rig begins to turn, the mirror that looked down along the side of the vehicle is directed into the side of the trailer and the driver is blinded to activity on that side of his truck.

Sensor-based warning systems have also been proposed. For instance, Sonar Safety Systems of Santa Fe Springs, Calif. has a rear-mounted sensor system based on a single sensor which detects objects in three distance zones from the rear of the vehicle. The system provides alarms and audible feedback that inform the driver whether the obstacle is close (Zone III), out a little farther (Zone II), or even farther out yet (Zone I).

What is needed is a system and method for automatically warning the driver of potential collisions at the front, to the sides and behind a vehicle.

SUMMARY OF THE INVENTION

According to one aspect of the present invention, a collision avoidance system for a vehicle includes one or more transmitting devices, one or more receiving devices, a control module and a mirror. The receiving devices receive return signals and send information regarding the return signals to the control module. The control module detects a hazard based on the information received from the one or more receiving devices. The mirror includes visual indicators for warning a driver of the hazard detected by the control module.

According to another aspect of the present invention, a method of alerting a driver of potential hazards is described. A potential collision event is detected and a symbol is displayed within a mirror indicating that the potential collision event has been detected.

According to yet another aspect of the present invention, a collision avoidance system includes a plurality of transmitting devices, a plurality of receiving devices, a control module connected to the plurality of transmitting devices and the plurality of receiving devices and a side view mirror. The plurality of transmitting devices include a first and a second transmitting device, wherein the first and second transmitting devices transmit a first signal and a second signal, respectively. The plurality of receiving devices include a first and a second receiving device, wherein the first receiving device receives a return representative of the signal transmitted from the first transmitting device and transmits a first return signal representative of the first return and wherein the second receiving device receives a return of the signal transmitted from the second transmitting device and a second return signal representative of the return. The control module receives the first and second return signals and detects potential hazards as a function of the first and second control signals. The side view mirror includes visual indicators for warning a driver of potential hazards detected by the control module.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Figure 1:
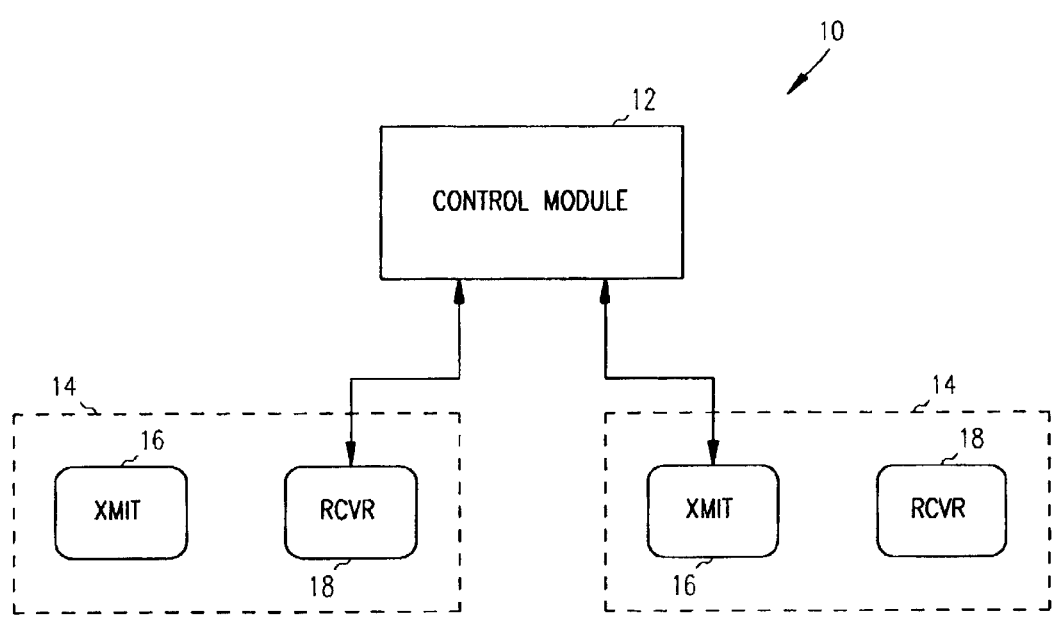
FIG. 1 shows a collision avoidance system.

FIG. 1 shows a collision avoidance system 10 according to the present invention. System 10 includes a control module 12 and two sensors 14. Each sensor 14 includes a transmitter 16 and a receiver 18. In one embodiment, transmitter 16 and receiver 18 are mounted together in a single sensor housing. In another embodiment, transmitter 16 and receiver 18 are mounted in separate housings.

In one embodiment, sensors 14 include separate acoustic transducers for each of transmitter 16 and receiver 18. In another embodiment, a single acoustic transducer is used for both transmitting a signal and receiving its echo. Some transducers which would operate in such a system 10 are the 9000 Series Piezo Transducers available from Polaroid OEM Components Group and the KSN 6530 45 KHz transducer available from Motorola. In addition, the KSN 6529 45 KHz transducer available from Motorola could be used for receiver 18.

In another embodiment, sensors 14 are micropower impulse radar (MIR) devices. In one embodiment, MIR devices such as those described in the white paper entitled "Microwave Impulse Radar (MIR) Technology Overview", available from Lawrence Livermore National Laboratory, are used. The advantage of such devices are that they are low power and fairly inexpensive. In addition, a single device can be used as both transmitter 16 and receiver 18.

In yet another embodiment, sensors 14 are microwave or millimeter wave transceiver devices. In one such embodiment, each transceiver includes a small integrated antenna and electronic interface board. In another embodiment, sensors 14 include both proximity detectors 14.1 and longer range detectors 14.2. The longer range detectors incorporate a larger antenna to operate as a Doppler Radar Forward Looking Detector. An example of one such transducer is the model DRO3000 Microwave Transceiver Module available from Advanced Frequency Products of Andover, Mass.

Figure 2:
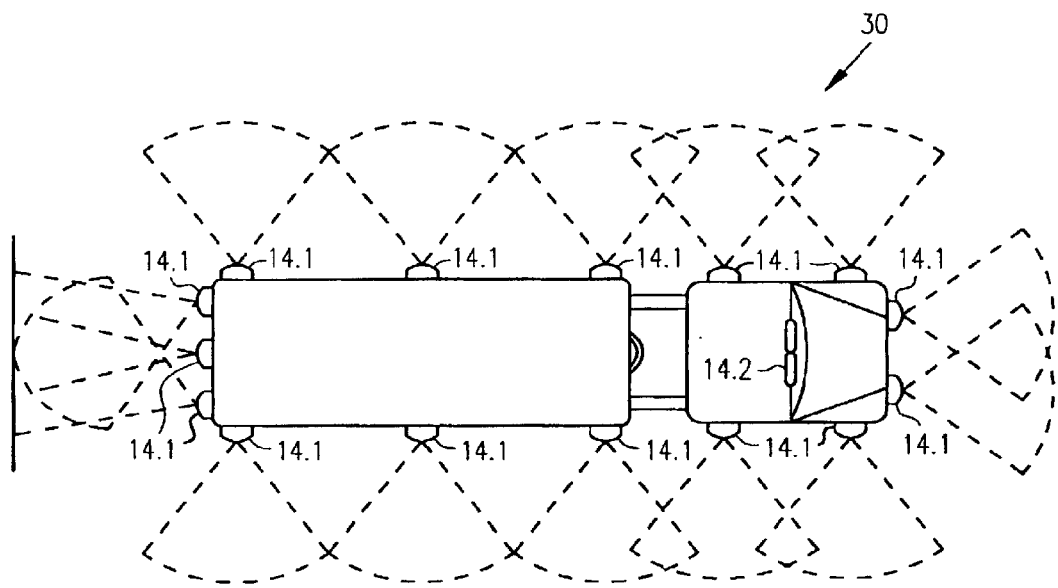
FIG. 2 shows a more complex embodiment of the collision avoidance system shown in FIG. 1.

In one embodiment, such as is shown in FIG. 2, a collision avoidance system 30 includes up to seventeen sensors 14 mounted around the periphery of a vehicle.

A variety of collision avoidance systems are described in "System and Method of Avoiding Collisions," U.S. patent application Ser. No. 09/130,279, filed Aug. 6, 1998 and assigned to the assignee of the present invention, the descriptions of which are hereby incorporated by reference.

Figure 3:
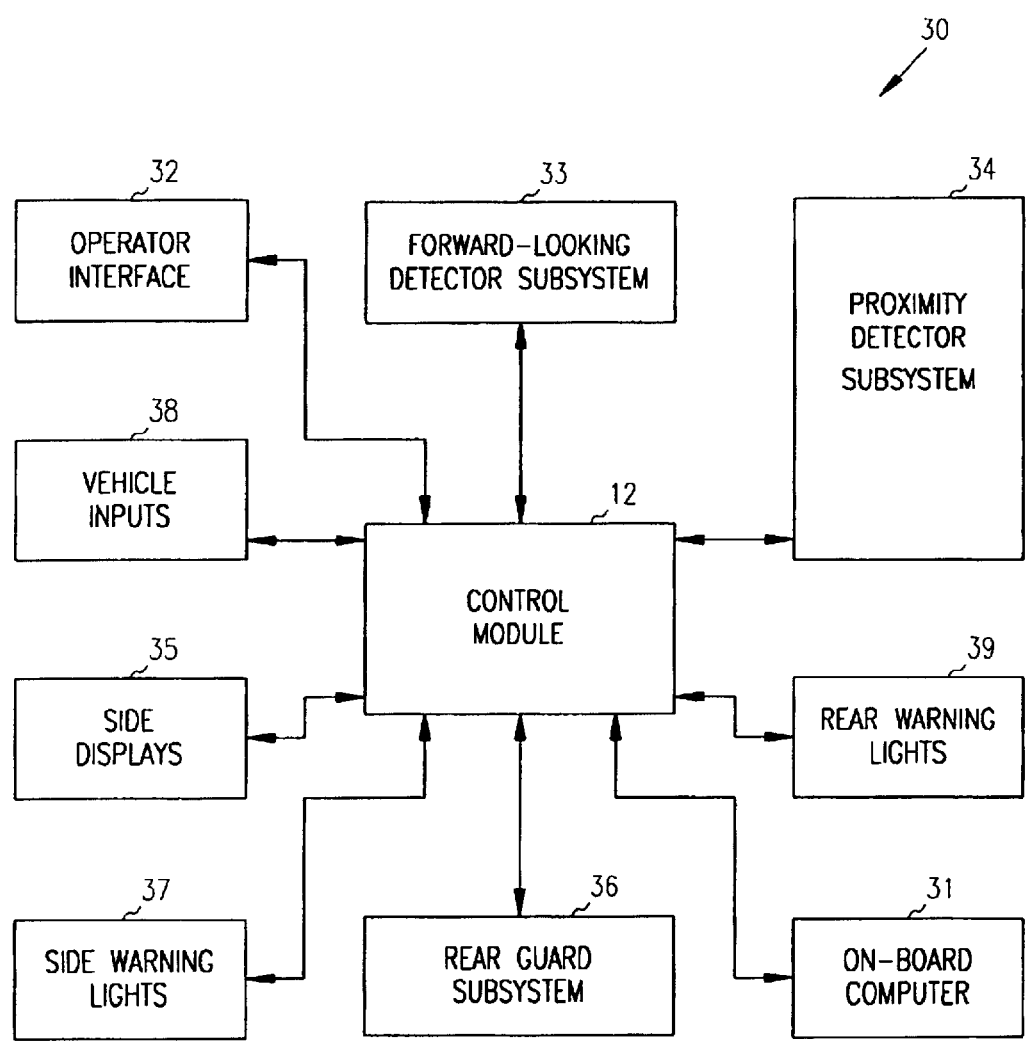
FIG. 3 is a system block diagram of a collision avoidance system according to FIG. 2.

In one embodiment, sensors 14 of system 30 are grouped in detector subsystems. The output from each detector subsystem is fed into control module 12, as is shown in FIG. 3. As shown in FIG. 3, system 30 includes a control module 12, an operator interface 32, a proximity detector subsystem 34 and a rear guard subsystem 36. Each subsystem includes one or more sensors 14. System 30 may also include a forward-looking detector subsystem 33 (with two or more sensors).

In one embodiment, each sensor 14 is a stand alone smart sensor as is described in "System and Method of Providing Scalable Sensor Systems Based on Stand Alone Sensor Modules," U.S. patent application Ser. No. 09/505,418, filed Feb. 16, 2000 and assigned to the present assignee. The description of the sensors and of systems of such sensors is incorporated herein by reference.

In one embodiment, proximity detector subsystem 34 includes up to 15 sensors and rear-guard subsystem 36 includes up to 7 sensors. The output of each sensor in each detection subsystem is fed into control module 12, as shown in FIG. 3.

In one embodiment, system 30 includes side displays 35, side warning lights 37 and rear warning lights 39. In one embodiment, control module 12 includes a vehicle inputs module 38 for receiving signals from other vehicle sensors. In addition, control module 12 may communicate with an on-board computer 31.

Figure 4A:
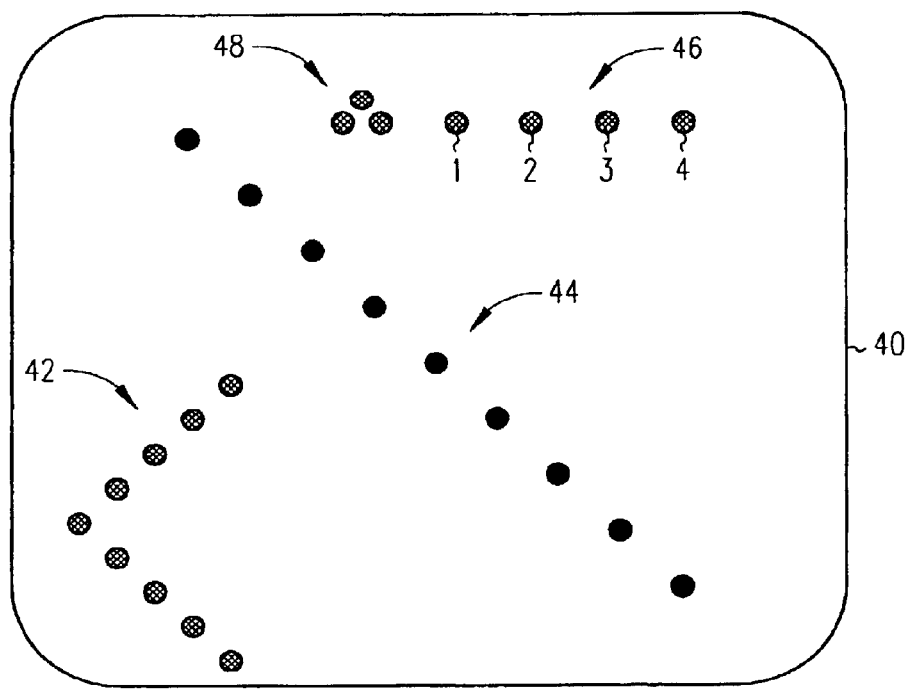
FIGS. 4a and 4b show side view mirror displays which can be used with the control modules of FIGS. 1 and 3.
Figure 4B:
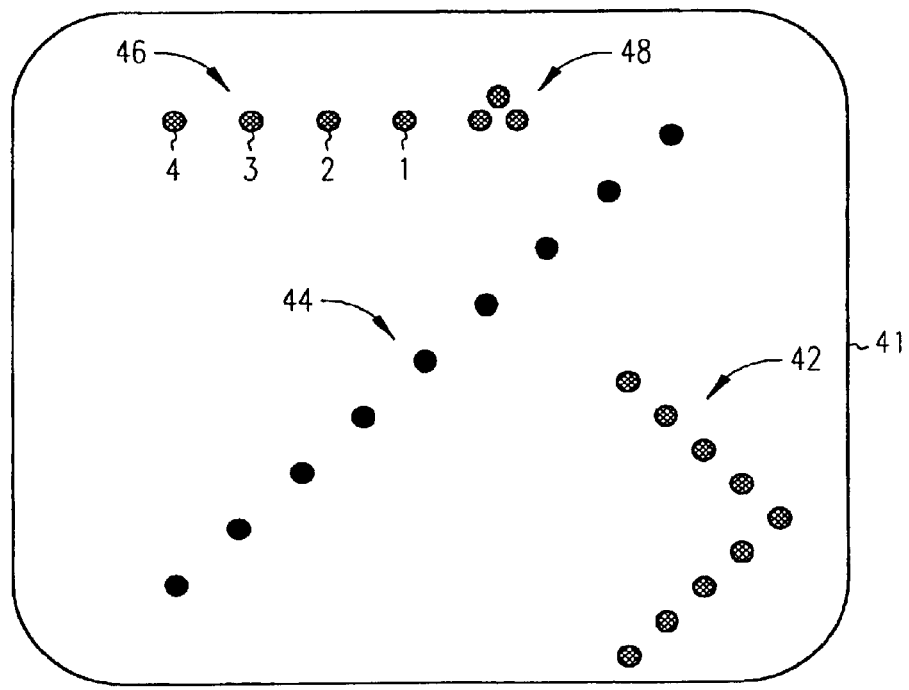

In one embodiment, side displays 35 and side warning lights 37 are integrated into the side view mirror of the vehicle. One such embodiment is shown in FIG. 4a, where a left side view mirror 40 includes a chevron 42, a slash 44 and a backup indicator 46. A similar embodiment is shown in FIG. 4b, where right side view mirror 41 includes a chevron 42, a slash 44 and a backup indicator 46. A numeric range indicator, such as indicator 35 shown in FIG. 10 could also be included.

Chevron 42 is a arrow-shaped set of LEDs which flash in time to the turn signal. The arrow-shaped chevron is visible by drivers of vehicles in the adjacent lane as a warning to them that the host vehicle is about to turn or change lanes. In another embodiment, a flashing amber light or other such visual warning can be directed at vehicles in adjacent lanes.

Slash 44 is a diagonal line of LEDs which flash to indicate that there is a potential hazard in the adjacent lane which would make a lane change or turn unwise. For example, if the left turn signal is activated indicating the driver's intent to change lanes to the left, or to make a left turn, slash 44 will flash in side view mirror 40 if an object is detected within a specified range of the left side of the vehicle. The same is true for the right side mirror if the right turn signal is active and an object is detected on the right hand side of the vehicle.

In one embodiment, slash 44 is a diagonal series of LEDs that cross mirrors 40 and 41 between two opposite corners. A more reduced line of LEDs could also be used.

In one embodiment, slash 44 is a steady-state indicator which remains on as long as the turn signal is on and the potential hazard is detected. In another embodiment, slash 44 pulses on and off at a rate of 4 Hz to catch the driver's attention. Other flashing sequences could also be used.

Backup indicator 46 is a series of LED symbols used to help the driver avoid objects while backing up the vehicle.

In one embodiment, the LEDs are arranged in a horizontal row along the top or bottom of each side view mirror. In one embodiment, backup indicator 46 is incorporated in only one of the side view mirrors 40 or 41. In one embodiment, triangle 48 is displayed when the transmission is in reverse and an object is detected within a predefined distance (e.g., 25 feet) of the rear of the vehicle. In one such embodiment, triangle 48 is a cluster of three LEDs such as is shown in FIGS. 4a and 4b.

In one embodiment both triangle 48 and the remaining four LEDs are displayed when the transmission is in reverse and an object is detected within a predefined distance (e.g., 25 feet) of the rear of the vehicle. In one such embodiment, the four LEDs are turned off one at a time moving closer to triangle 48 as the vehicle moves closer to the object behind the truck. When the vehicle is at close range to the object behind the truck, the four LEDs and the triangle flash (e.g., at 4 Hz) to alert the driver to stop the vehicle.

In one embodiment, the remaining four LEDs turn on one at a time moving closer to the triangle as the vehicle moves closer to the object behind the truck. When the truck is within a second predefined distance (e.g., three feet) of the object, all four LEDs flash (e.g., at 4 Hz) to alert the driver to stop the vehicle. The LEDs remain flashing until the transmission is shifted out of reverse.

In another embodiment, the LED furthest from triangle 48 (LED 4) lights when the distance is less than 25 feet but greater than 12 feet. The next LED (LED 3) lights when the distance is less than 25 feet but greater than 8 feet. The next LED (LED 2) lights when the distance is less than 25 feet but greater than 5 feet and the final LED (LED 1) lights when the distance is less than 25 feet but greater than 3 feet. As in above, when the truck is within 3 feet of the object, all four LEDs flash to alert the driver to stop the vehicle, and remain flashing until the transmission is shifted out of reverse.

Figure 10:
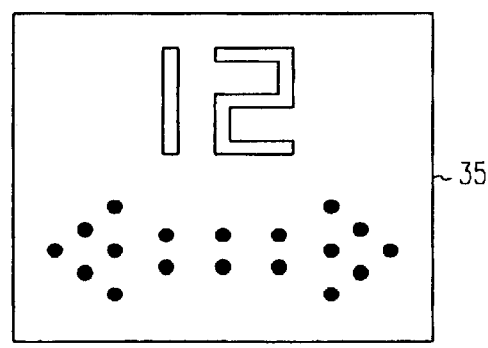
FIG. 10 illustrates a side display module.

An alternative to the sequencing of LEDs 46 described above is to incorporate a numeric range indicator 35 such as is shown in FIG. 10.

Such an approach integrates a lot of information into the side view mirrors. Since the side view mirrors have to be viewed as part of a turn, lane change or when backing the vehicle, such an approach provides a lot of information with minimal impact on the driver.

Other symbols can also be used. For example, slash 44 can be replaced with a different symbol. Also, the triangle and series of LEDs of backup indicator 46 can be replaced with another form of distance-related information.

In one embodiment, separate nine wire cables run from control module 12 to each of side mirrors 40 and 41. Each wire is at least 18-gauge stranded wire. The cables are connected to control module 12 with nine pin D subminiature connectors.

In another embodiment, a two-wire data communication cable is run from a stand-alone smart sensor to a display processor in the manner described in "System and Method of Providing Scalable Sensor Systems Based on Stand Alone Sensor Modules," described above, the description of which is incorporated herein by reference. The hazard information is sent from the stand-alone smart sensor over the data communications cable to the display processor which, in turn, drives the visual indicators in side view mirrors 40 and 41.

In one embodiment, a digital I/O board within control module 12 drives LEDs within each of side mirrors 40 and 41. A control register within the digital I/O board contains eight left side mirror bits and eight right side mirror bits. In one embodiment, each bit is associated with a particular function. For instance, in one embodiment, each set of bits includes one bit for each of the individual LEDs 1–4 on its respective side mirror, a bit for triangle 48 and a bit for slash 44. In addition, a bit can be used to place side mirror 40 in a flash mode which overrides the individual bits to place LEDs 1–4 and triangle 48 in a flashing status during which LEDs 1–4 and triangle 48 flash at a predetermined frequency (e.g., 4 Hz).

In another embodiment, control circuitry is placed in proximity to mirrors 40 and 41 and control module 12 writes commands to the control circuitry to cause the appropriate signals to light or flash. Such an approach reduces the amount of wiring needed to put system 30 in place.

In one embodiment, a single bit is used to turn on triangles 48 in mirrors 40 and 41. This reflects the fact that triangles 48 will typically be active at the same time. Similarly, LEDs 1–4 for both the left and right side could be driven by the same bits and driver electronics.

In one embodiment, control module 12 includes program code for initiating a self test. During self test, all LEDs in side mirrors 40 and 41 are lit for a predetermined period (e.g., five seconds) so that the driver can verify that all lights are operational Self test is entered automatically during the system initialization process, or can be initiated by the driver.

In another embodiment, the LEDs flash on and off for a predetermined period of time during self test.

Collision Avoidance

Collision avoidance systems typically have put transducers on the rear of the vehicle and measure the distance from the sensor to the object. This is not optimal since those sensors are transmitting in an arc. They are looking at the distance from the sensor to the object and back again. That may not, however, be the perpendicular distance from the vehicle to the object. A deficiency, therefore, of such systems is that they do not communicate to the driver the transverse location of this object.

In one embodiment of the system shown in FIGS. 1 and 2, a plurality of sensors 14 are mounted on the back of the vehicle. Control module 12 takes the readings from the rear-mounted sensors 14, determines whether it can triangulate and calculates an actual perpendicular distance from the truck to the object. This is important because the truck driver really wants to know, not that the object is off at this angle over here five feet away, is how far he can back up before he hits the object. In contrast to other approaches, this triangulation procedure makes systems 10 and 30 precision distance measuring systems.

Figure 5A:
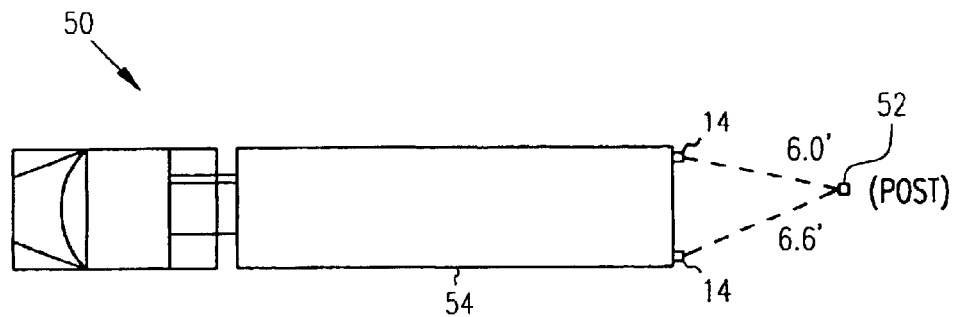
FIGS. 5a–c show the operation of two rear-mounted sensors according to the present invention.

FIG. 5a represents the top view of a tractor trailer rig 50 with a post 52 located behind the trailer 54. The post 50 represents a hazard unless the driver knows the precise distance from the vehicle. Sensor 14 on the right rear of the trailer senses the post 52 at a distance of six (6) feet. Sensor 14 on the left rear of the trailer senses the post at a distance of just over six and one half (6.5) feet. Control System 12 calculates that the actual distance to the post as 5.2 feet and determines it is located just to the right of the center of the trailer. The distance is then displayed digitally on the control module 12. The transverse location is displayed, for instance, on the bar graph located just to the right of the digital display and it indicates the location of the post.

Perpendicular distance between the rear of a vehicle and external objects is increasingly important the closer the vehicle gets to an external object. In the same example as above, when sensor 14 on the right rear of the trailer senses the post at a distance of four (4) feet and the sensor 14 on the left rear senses the post at a distance of 4.8 feet, the actual perpendicular distance is 2.6 feet. The Precision Measurement System described in U.S. patent application Ser. No. 09/130,279, the description of which is hereby incorporated by reference, correctly uses the sensor 14 distance readings as well as the known distance between the left and right sensors 14 to calculate the exact perpendicular distance to the post. This is very important as an aid to the driver in the prevention of an accident.

In one embodiment, a third sensor 14 is mounted between the right and left sensors 14. With the aid of third sensor 14, the system can determine that the object is a point source (such as a post) as opposed to a wall or large vehicle. The sensor 14 on the right rear of the trailer senses the post at a distance of six (6) feet. The sensor 14 on the left rear of the trailer senses the post at a distance of just over six and one half (6.6) feet. Control module 12, knowing that the object is a point source, calculates that the actual distance to the post is 5.2 feet and is located just to the right of the center of the trailer. The distance is displayed digitally on the Operator Interface and Side Display Modules. The transverse location is displayed in graphic form (e.g. bar graph) on the Operator Interface. One such embodiment is described in U.S. patent application Ser. No. 09/130,279, the description of which is hereby incorporated by reference.

Figure 5B:
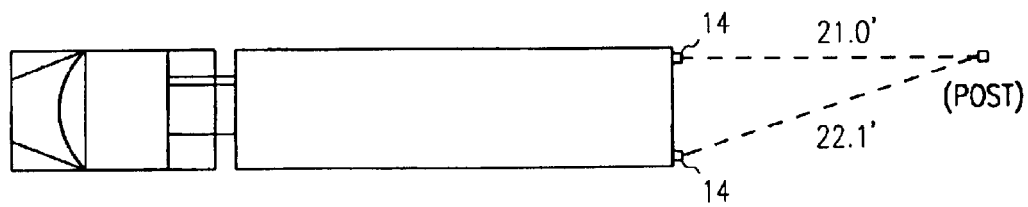

FIG. 5b represents the top view of a tractor trailer with a post located far behind the trailer. The post represents a hazard unless the driver has sufficient information to aid in maneuvering around the obstacle. The sensor 14 on the right rear of the trailer senses the post at a distance of 21.0 feet. The sensor 14 on the left rear of the trailer senses the post at a distance of 22.1 feet. The control module 12 calculates that the actual distance to the post is 21.0 feet, and that it is located near the right side of the trailer. The distance is displayed digitally on the operator interface. The transverse location is displayed on the bar graph located just to the right of the digital display and it indicates the location. Precision distance measurement is less of a concern when obstacles are a long distance from the rear of the vehicle. However, productivity is a concern. With the aid of the transverse location information and the ability of the control module 12 to detect objects up to 25 feet behind the vehicle, the driver of the tractor trailer shown in FIG. 5b can readily maneuver the vehicle to avoid the obstacle without having to stop, drive forward, and then proceed in backing the vehicle.

In order to triangulate, the distance between sensors 14 must be known. Therefore, the distance between sensors 14 must be controlled. In one embodiment, the distance between sensors 14 is a system parameter that can be programmed. In one such programmable embodiment, a programming device is provided to a dealer or a fleet owner such that once sensors 14 are installed, they can measure the actual distance between the sensors and the distance from the sensors to the sides of the vehicle and program that into control module 12. Control module 12 can then accurately calculate distance.

Figure 6A:
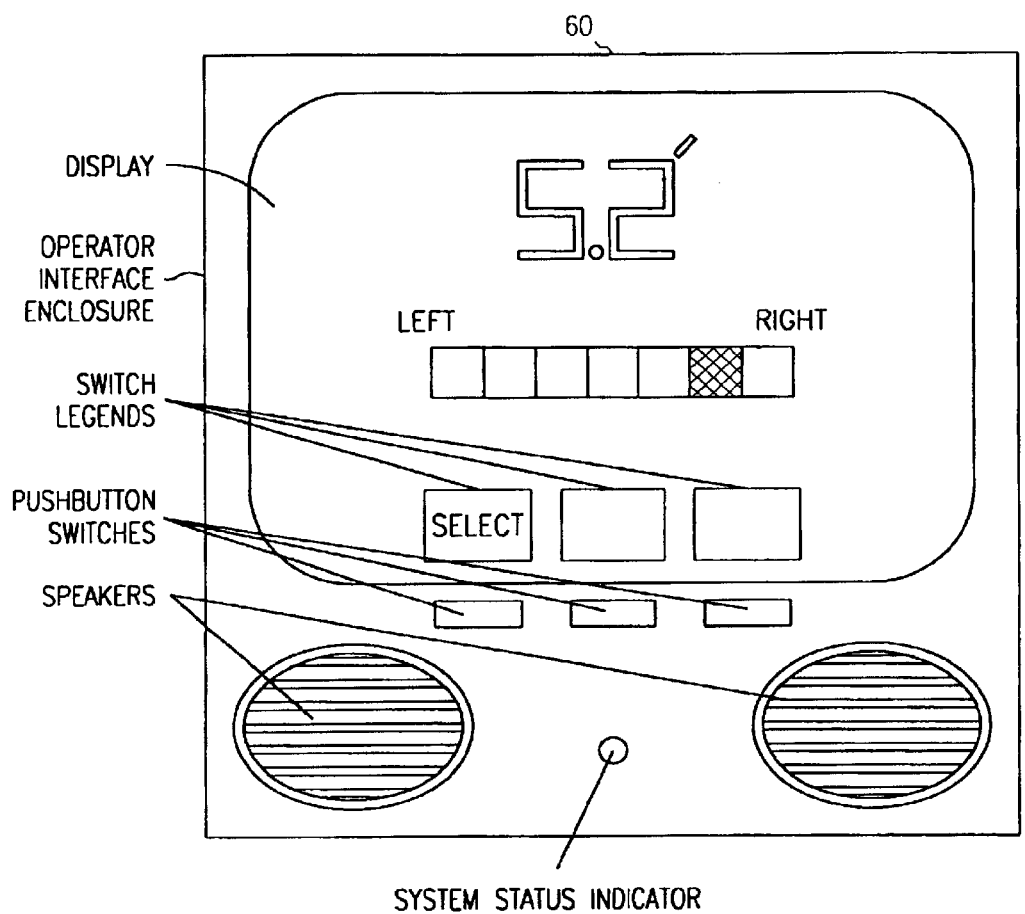
FIGS. 6a–c show one embodiment of an operator interface units which can be used with the control modules of FIGS. 1 and 3.
Figure 6B:
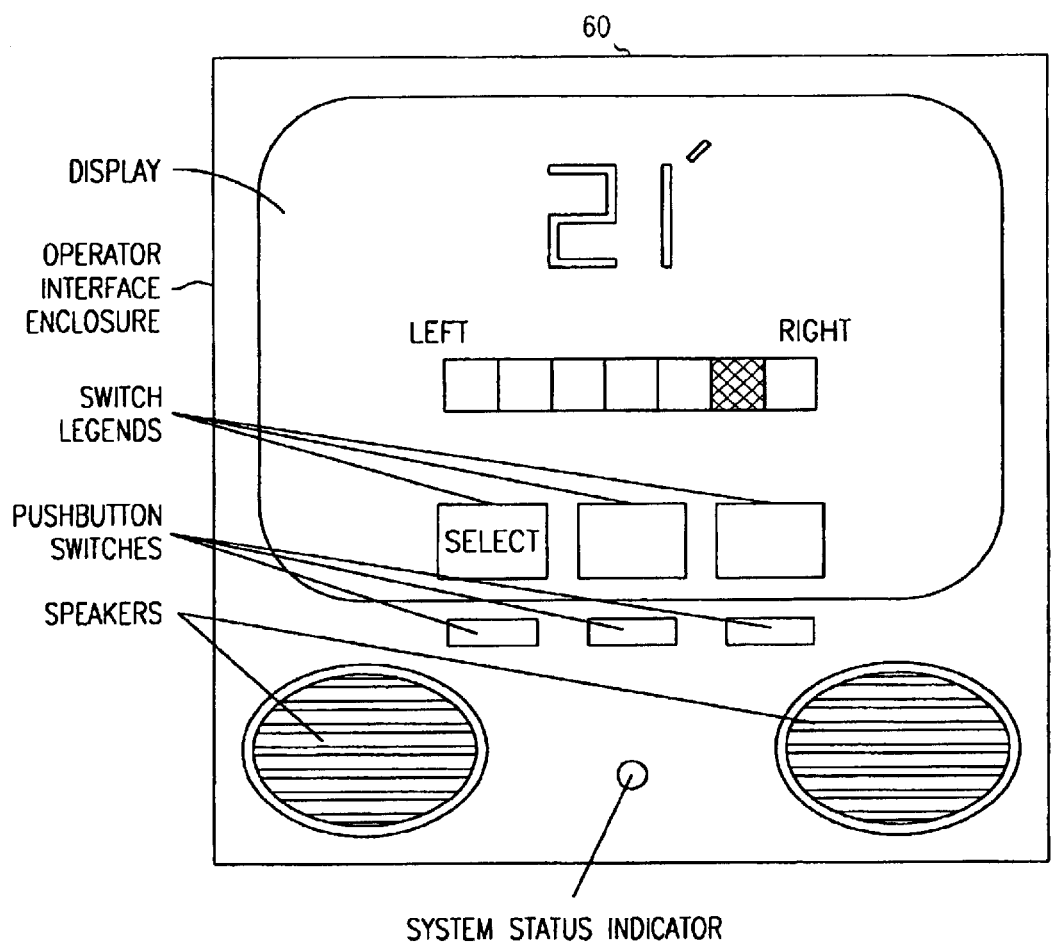
Figure 6C:
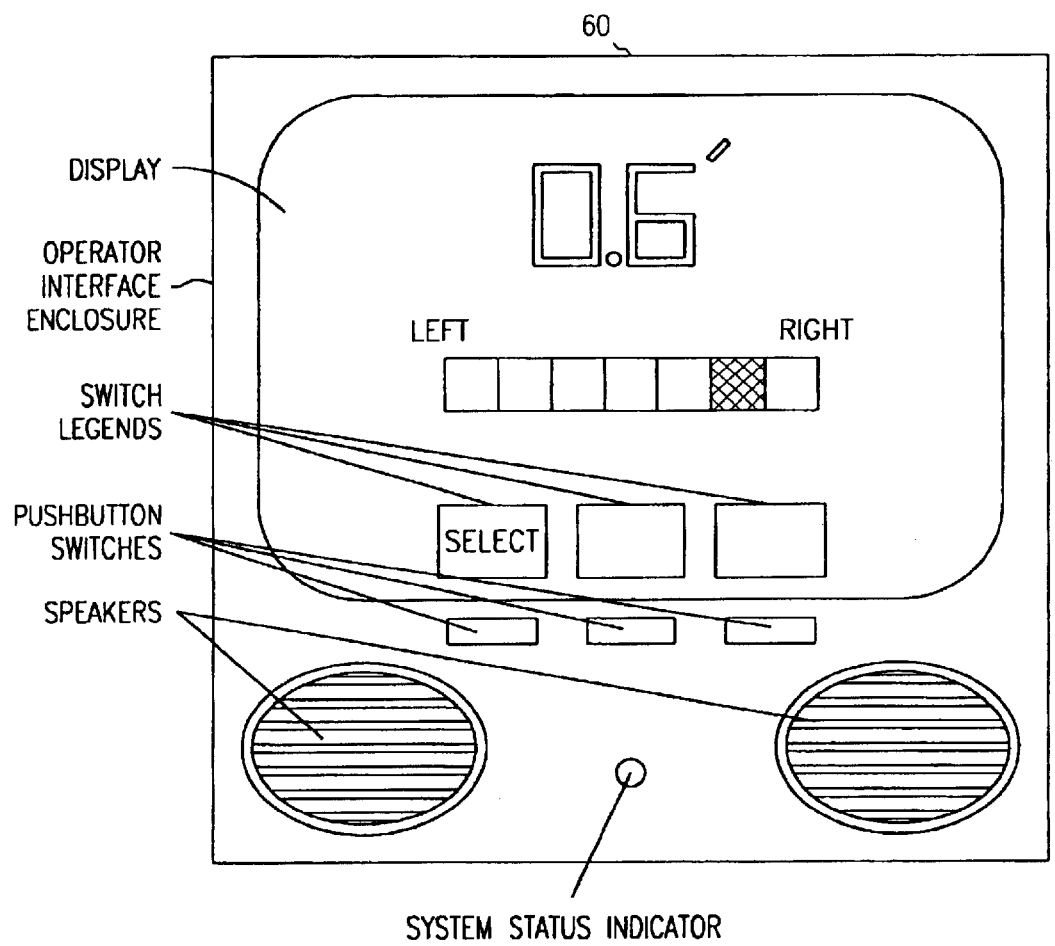

For example, if a collision avoidance system 10 or 20 provides a measurement, is that object directly behind the vehicle, or is it off to the left or right? Is it actually far enough off to the left or far enough off to the right that he won't hit it but needs to be aware of it? To provide more accurate information, in one embodiment, control module 12 calculates transverse location and communicates that information via a graphical indicator. Such an approach is shown in FIGS. 6a–6c and is described in U.S. patent application Ser. No. 09/130,279 filed Aug. 6, 1998, the description of which is hereby incorporated by reference.

Another issue is the vertical position of the rear-mounted transducers, relative to the ground, and relative to the impact point with a loading dock, is an important issue. For example, loading docks have an impact plank that protrudes out from the wall. If sensors 14 are mounted too low, you may actually look underneath the impact plank. If so, the truck could hit the plank under power with the driver thinking he or she had another 4–6 inches to go. In one embodiment, system 10 includes vertical compensation as discussed below. In one embodiment, vertical compensation is activated automatically via a front panel switch mounted in a front panel module 60 such as is shown in FIGS. 6a–6c. The purpose of this feature is to compensate for the protrusion of loading dock impact pads in cases where sensors 14 are located below the point of impact of the trailer with the loading dock impact pad.

Figure 5C:
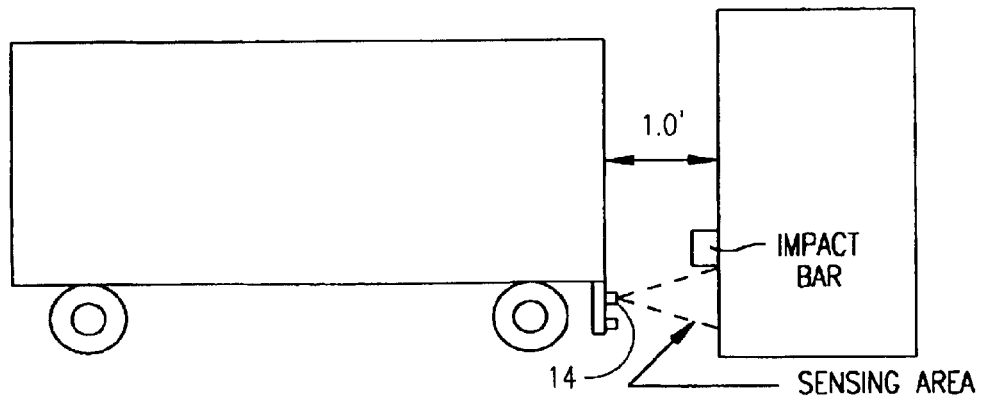

FIG. 5c represents the side view of a tractor-trailer pulling up to a loading dock. The impact pad is the point of contact with the trailer. The depth (i.e., front-to-back) of the impact pad is typically 4.5 inches. The top of the impact pad is typically 48 inches above the ground. In one embodiment, when the sensors 14 are located below the point of impact of the trailer with the impact pad, the systems 10 and 30 adjust the distance measurement by 4.5 inches if the Transducer Assembly is mounted so low that it cannot detect the impact pad when the trailer is within 12 inches of the impact pad. For example, if the perpendicular distance from the rear of the trailer to the loading dock is 1 foot and the Transducer is 2 feet below the impact bar, the measured distance of 1.0 feet will be corrected to 0.6 feet.

Figure 7:
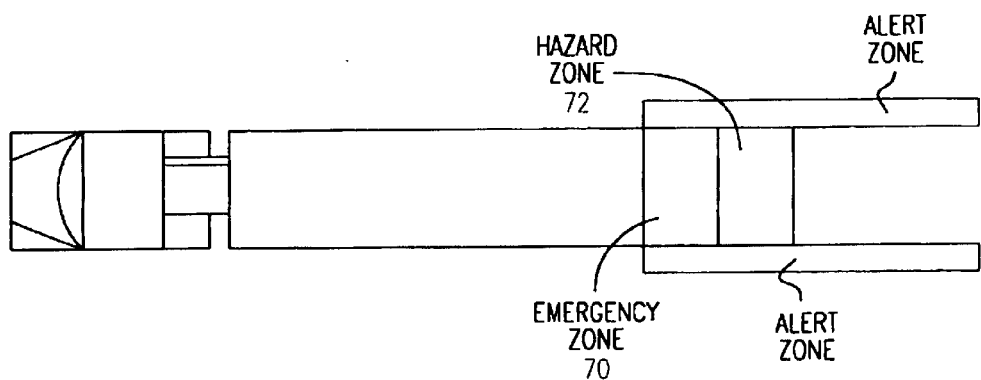
FIG. 7 illustrates a backup warning system.

In one embodiment of systems 10 and 30, a backup warning system is provided as shown in FIG. 7. In one such embodiment, sensors 14 include transducers placed on the rear of the vehicle. Those transducers are activated when the driver shifts his transmission into reverse. As soon as the driver shifts into reverse, the transducers on the back begin to send out sound energy from the transducers, which bounces off an object, comes back to a receive transducer. Distance is then calculated as a function of time of return (e.g., acoustic applications) or intensity of the return signal (e.g., radar applications). In one embodiment, a Multiple Hypothesis Ranging algorithm is used to calculate distance. Such an algorithm is described in U.S. patent application Ser. No. 09/130,279 filed Aug. 6, 1998, the description of which is hereby incorporated by reference.

In addition, in one embodiment, when sensors 14 detect that there's something back there, systems 10 and 30 alert the driver immediately (e.g., by flashing 44, 46 or 48), so that he or she can take action and not back into whatever object is being detected.

The intent is to provide immediate feedback to the driver shortly after the vehicle transmission is shifted into reverse. This information includes information on objects in the vicinity of the rear of the vehicle as well as information on objects in the path of the rear of the vehicle. In one embodiment, in the case where objects are in close proximity to the rear of the vehicle, but not in the path of the vehicle, an auditory prompt representing an "alert" is sounded for the driver. (This is in addition to lighting the appropriate LEDs in mirrors 40 and 41.) If an object is detected in the path of the vehicle, in the range of 5 to 10 feet, the system will categorize that as a hazard situation and an auditory prompt representing a "warning" is sounded for the driver. If an object is detected in the path of the vehicle, within a range of 5 feet, the system will categorize that as an emergency situation and an auditory prompt representing an "emergency" is sounded for the driver. After the vehicle has been backing up for two or more seconds, the alert, warning, and emergency will have cleared and the system will begin providing range feedback to the driver in the form of distance information, as displayed on the Operator Interface and Side Display Modules, and auditory feedback in the form of pulsed tones. The closer the vehicle gets to an object, the faster the repetition rate of the pulses until the rear of the vehicle is within one foot at which time the pulses have turned into a continuous tone. In the process of backing up, if a person or vehicle suddenly appeared behind the vehicle, the system will automatically detect a sudden change in range to the object and the "emergency" auditory prompt will be issued to the driver so he/she can take action.

In one such embodiment, when the driver is going to back up, if there is an object within range, one of three scenarios will happen. First, if the system senses a truck or other object close to the truck on either side, systems 10 and 30 will give him an alert. The system knows that there is no collision potential here, but just alerts him that there is something there. In one embodiment systems 10 and 30 provide one set of tones to the driver for an alert. Second, if there is an object in the range of 5–10 feet as soon as the driver throws it into reverse, systems 10 and 30 sense the object and provide the driver with a different alarm (e.g., a different set of tones or a different flashing light). This alarm is called a hazard alarm. And again, that's to alert the driver so he can take action on the hazard alarm. Third, if there is an object within 5 feet, the driver receives an emergency alarm (i.e., a third set of tones, or a third flashing light). Systems 10 and 30 therefore provide feedback indicative of the distance to an object behind the driver. In one such embodiment, audible or visual feedback tells the driver he's getting closer; the pulses go faster and faster to the point where, when he's within a foot, the pulses are continuous. But, if in the process of backing up, the system automatically detects that the distance suddenly became shorter, it will provide the emergency alarm right away so the driver can take action. For example, if somebody drove in behind the driver, or some kid ran in back of the vehicle, systems 10 and 30 sense that and automatically provide the emergency alarm so the driver can take action. As noted above, some of the systems that are out there actually detect zones of distance and provide feedback for that. Systems 10 and 30 go beyond that in that they detect and differentiate objects outside the area of potential collision from those inside and secondly, they can detect sudden changes in distance for an emergency alarm.

In one embodiment, the side view mirrors of FIGS. 4a and 4b display information corresponding to the zones. In that embodiment, detection that the truck is in emergency zone 70 causes rapid flashing of LEDs 1–4 and triangle 48 to alert the driver of the proximity of the object. In addition, in one embodiment hazard zone 72 is divided into four zones corresponding to each of LEDs 1–4 as described above.

In one embodiment a self test capability is provided. Self test addresses several issues. One is when systems 10 and 30 are first turned on (i.e., the driver throws the power switch into an "on" position) the systems will turn all the indicators on so that the driver right away can see that all the indicators are lit. In addition, control module 12 tests its internal circuitry to ensure that the system comes up running. The second thing the system does is while it's running, if the micro controller or microprocessor in control module 12 were to fail, systems 10 and 30 then provide a "watch-dog timer" that will detect the failure. Thirdly, the driver can activate self test mode. On doing so, in one embodiment, control module 12 flashes all of the indicators of front panel 20 and/or of mirrors 40 and 41. In one such embodiment, control panel 20 includes an indicator 24 for each transducer mounted around the vehicle and, on entering self test, transducer indicators 24 begin to flash. The driver then walks around the vehicle and gets back in the cab. Every one of those transducers should detect him; each time they detect him, the transducer indicator 24 associated with the transducer goes off (i.e., quits flashing). If the driver gets back to the cab and there's a transducer still flashing, he knows that something didn't work and he can investigate the problem.

Wireless Portable Transducer System

Figure 8:
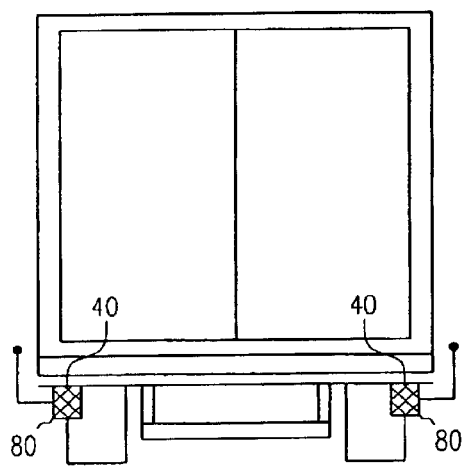
FIGS. 8 and 9 show wireless portable transducer systems.
Figure 9:
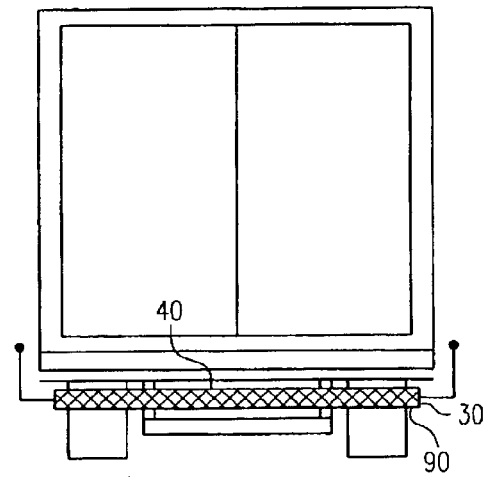

In one embodiment sensors 14 are provided within a wireless portable transducer system 40. The problem with wired transducer systems is that, if you look at the number of trailers out there, they far exceed the number of truck-tractors out there. And so truck-tractors are basically moving from trailer to trailer. It could easily reach the point where establishing a complete collision avoidance system 10 or 30 on each combination of tractors and trail would be prohibitively expensive. To better address the needs of fleet owners, a system 10 is constructed having a wireless portable system 40. FIGS. 8 and 9 show two embodiments of such portable systems.

In FIG. 8, two boxes 80 provide the portable transducer function. Each box 80 includes an antenna sticking out the side. Each box 80 mounts under the trailer and clamps to the frame of the trailer. Inside each box 80 is an ultrasonic transmitter and receiver, electronic circuitry, and a radio transmitter and receiver. A two wire cable connects battery from the trailer to the electronic circuitry to provide power. A cable between each box provides common control signals from the radio transmitter/receiver such that signals from either rear mounted antenna control both Transducer Assemblies.

In FIG. 9, there is one long extrusion 90 with an antenna sticking out each side. The extrusion clamps to the frame on the rear of the trailer. The extrusion 90 may be made of one piece, or two pieces (one within another) with a mechanism to adjust the width of the extrusion to the width of the trailer. A Transducer Assembly (transmitter and receiver) is mounted on each end of the extrusion. The electronic circuitry, including radio transmitter and receiver are mounted inside the extrusion. In one embodiment, a two wire cable connects battery from the trailer to provide power to the electronic circuitry.

Signals to and from the boxes 80 are communicated to the control module of the collision avoidance system via the Wireless Communicator to detect, measure, and display distance to objects behind the trailer.

System 40 is designed so that it can quickly be disconnected from one trailer and moved to another trailer.

In one such embodiment, a Wireless Portable Transducer System provides for wireless communication between the electronics mounted in the cab of the vehicle and the Portable Transducer Array mounted on the rear of the trailer. Power to operate the Portable Transducer Array is provided by connecting in to existing power wiring provided to the trailer from the truck's electrical system.

Dependent on the transducer technology used, the Portable Transducer Array could be made to be totally battery operated. For example, if the Portable Transducer Array were designed using Micropower Impulse Radar, Doppler Radar or other alternative low-power technologies, the transmitting and receiving functions to measure distance to objects behind the vehicle would be low power and could operate on batteries built into the Portable Transducer Array. The communications between the electronics in the cab of the vehicle and the Portable Transducer Array could also use Micropower Impulse Radar, Doppler Radar, or other alternative low-power technologies, thus enabling portability with built-in battery power. This solution will eliminate the need to tap into the truck's electrical system to power the Portable Transducer Array.

Wireless embodiments of collision avoidance systems are described in U.S. patent application Ser. No. 09/130,279, filed Aug. 6, 1998, the descriptions of which are hereby incorporated by reference.

In one embodiment, the bulk of the electronics stays with the tractor. In addition, the rear transducer array stays with the tractor (i.e., as the driver goes from trailer to trailer he simply pulls off system 40 and clamps it on the next trailer. In one such embodiment, a connector arrangement is provided so the driver can connect system 30 to the power that's already on the trailer and quickly get the system up and running.

In another embodiment, multiple sensors are designed into the wireless subsystem 40 to detect obstacles to the rear of the vehicle and on either side of the vehicle. Communication with control module 12 is via wireless digital signals. Control module 12 is designed to sense when the wireless portable sensor subsystem is not installed or is not functioning properly.

Different quick-connect mounting arrangements might be needed for different style trucks. In one embodiment, as is shown in FIG. 9, portable wireless sensor subsystem 40 is a tubular structure with integral electronics, battery pack, and sensors mounted internal or external to the structure. The unit would clamp on the trailer chassis or the underride bumper provided on the rear of many trailers. Antennas would be mounted on one or both sides of the wireless portable sensor subsystem protruding just outside the left and right edges of the trailer. In another embodiment, as is shown in FIG. 8, portable wireless sensor subsystem 40 is enclosed in two separate housings mounted at the left rear or right rear of the trailer. Again, quick connect mounting arrangements will be made to secure each unit to the trailer. A cable will interconnect each unit to allow the sharing of one battery pack, one controller, and one wireless transceiver.

In another embodiment of system 40, the sensors on the trailer are hardwired together. Communication between the sensors and control module 12, however, is wireless. In this case, a Transceiver Module is mounted on the tractor and a second unit on the trailer. The Transceiver Module on the trailer receives its power from the tractor-trailer umbilical electrical cable. Electrical signals are passed between tractor and trailer just like any non-wireless system with the exception that the signals are converted to wireless communication and then reconverted back to their electrical form at the other end. This approach provides additional flexibility for the customer's needs.

In one embodiment of system 30, systems may be equipped with a Side Display Module, such as is shown in FIG. 10. Side Display Module 35 is mounted internal or adjacent to each side view mirror. If one or more sensors 14 on the side of the cab detect an object, Side Display Module 35 will flash a forward-directed arrow on that side of the vehicle. In one embodiment, if one or more sensors on the side of the trailer detect an object, Side Display Module 35 flashes a rear-directed arrow on that side of the vehicle. If objects are detected on both the side of the cab and the side of the trailer, Side Display Module 35 flashes an arrow pointed both forward and to the rear. In one such embodiment, Side Display Module 35 also displays the distance between the rear of the vehicle and any object behind the vehicle when the transmission is in reverse.

In one embodiment, as is shown in FIG. 10, side display module 35 provides visual feedback to the driver when looking in the direction of either side view mirror. These modules 35 may be mounted on the edge of the side view mirrors, or they may be mounted inside the cab in the approximate line-of-sight as the side view mirrors.

In one embodiment, display modules 35 include a plastic housing, a small PCB Assembly with five LED indicators, two half-inch high seven segment displays, a cable which runs into the cab and connects to the rear of the Control module, and a clear plastic cover on the front of the module. The display module 35 mounted on the left side of the cab is identical to the module mounted on the right side of the cab. Display module 35 can be used in addition to the displays in side view mirrors 40 and 41.

In one embodiment, the seven-segment display drivers and LED driver are located in the Control module. The display shown in FIG. 10 shows a distance reading of twelve feet (12'). In one embodiment, distance readings associated with the Forward-Looking Detector Subsystem are not displayed on Side Display Modules 35. Only Backup Mode rear distance readings are displayed. If an alarm condition exists anywhere around the vehicle, all five LED's flash. The LEDs are not meant to provide any detector-specific information. Similarly, in one embodiment, the graphics displays shown in FIGS. 6a–c and/or the displays in mirrors 40 and 41 flash a visual warning on detection of an alarm condition.

Figure 11:
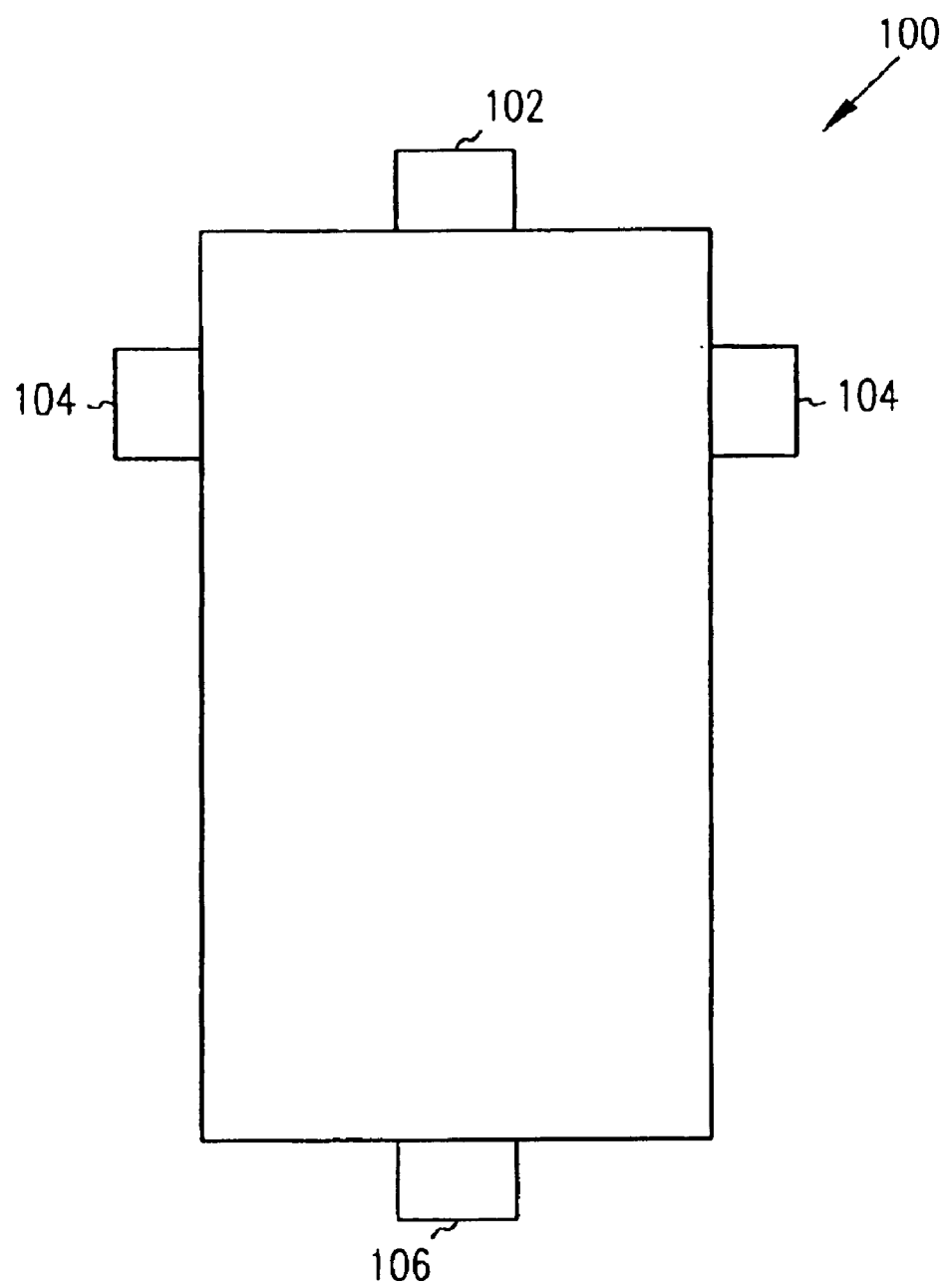
FIG. 11 illustrates an alternate embodiment of a collision avoidance system.

A collision avoidance system 100 for vehicles such as school buses will be described next. In one embodiment, as is shown in FIG. 11, system 100 includes a front sensor 102, two or more side sensors 104 and a rear sensor 106.

In one embodiment, system 100 mounts on and monitors the front, sides, and rear of a school bus. Unlike the standard collision avoidance system for which front and side sensors are intended to provide collision warning when the vehicle is above a certain speed, in one embodiment, system 100 activates front and side sensors (102, 104) when the bus is below a certain speed (starting or stopping). The primary intent of system 100 is to warn the driver of objects and pedestrians in close proximity to the bus.

In one embodiment, system 100 consists of multiple sensors and optional driver interface units (both visual and audible). If the optional driver interface units are not used, driver interface information is passed to an integrated vehicle driver information system via an SAE J1708 or SAE J1939 serial data link. In one embodiment, sensor arrays 102, 104 and 106 are stand-alone in that the sensor data processing required for valid object detection takes place on the sensors without the need (and cost) of a centralized computer.

In one embodiment, sensors consist of a combination of radar-based units (Type A and Type B) and ultrasonic-based units (Type U). The Type A sensor drives both the Type B and Type U sensors in a master/slave arrangement, providing the most cost-effective configuration for multiple sensor applications.

In one such embodiment, the sensors operate from 12 VDC vehicle battery power, with protection circuits to protect the electronics from (I) surges due to an overcharging alternator, (2) reverse voltage, or (3) electrostatic discharge.

In one embodiment, all sensor housings effectively seal against all environmental conditions, solvents, and sprays encountered on the exterior of a vehicle per SAE J1455. All sensors are certified to comply with SAE J1455 and with FCC requirements.

In one embodiment, all sensor housings are connectorized. Optional cables and harnesses designed to withstand the environmental conditions called out in SAE J1455 are available. Connectors utilize a locking mechanism, are environmentally sealed, and provide highly reliable electrical connections under continuous shock and vibration.

In one embodiment, sensor configurations provide a built-in-test function that detects a malfunction in any of the sensors and passes this information on to the driver interface.

In one embodiment, the Type A Sensor is a stand-alone radar sensor. In addition to processing it's own radar data, it processes radar data from up to 2 Type B sensors and ultrasonic data from up to 3 Type U sensors. The Type A sensor can be programmed during installation to indicate its position on the bus, as well as the position of any Type B or Type U sensors connected to it. Driver alert thresholds (sensitivity) are also field programmable. Standard configurations (position and sensitivity) are available, so programming is not required during installation.

In one embodiment, vehicle information (speed, reverse, stop flashers) is provided to the Type A sensor either directly, via a direct link to a radar sensor configured to sense speed and to the reverse switch and flasher switch, or indirectly, via the J1708 or J1939 interface on the Vehicle/Driver Interface (VDI) unit.

In one embodiment, the Type A Sensor can detect an object the size of a small child at up to 25 feet, with a ±45° beamwidth. The sensor can be turned off or the range limited based on its position on the vehicle and the vehicle status. The sensor can be programmed to detect objects that are moving at a speed of 0.2 to 10 mph relative to the vehicle, and to differentiate between stationary and moving objects.

In one embodiment, valid detection of an object is reported to the driver interface within 400 ms of when the object meets the detection criteria. A sudden change in range for objects with a radar view equal to or larger than a small child (30" tall) within 10' of the vehicle, is reported to the driver interface within 200 ms of occurrence.

In one embodiment, front sensors 102 and side sensors 104 are activated when the speed drops below 5 mph and stop flashers are turned on. Front sensors 102 and side sensors 104 remain active until the engine is turned off or vehicle speed moves above 10 mph. In one embodiment, rear sensors 106 are active whenever the transmission is in reverse.

In one embodiment, the Type A sensor provides alarm type and alarm on/off messages to the VDI unit based on its own radar data and radar and ultrasonic data from any attached slave units. For alarms based on front sensor data, once an object is detected and an alarm condition presented to the driver, the alarm remains on until the object is removed from the front of the vehicle. For alarms based on side sensor data, once an object is detected and an alarm condition presented to the driver, the alarm remains on until the object is removed from the side of the vehicle, or the vehicle speed exceeds 10 mph. For alarms based on rear sensor data, once an object is detected and an alarm or range condition is presented to the driver, the alarm remains on, or the range continues to be presented, until the object is removed from the rear of the vehicle, or the transmission is shifted out of reverse. All alarms are extinguished within 1 second of when the alarm clearing event occurs.

The Type B Sensor is identical to the Type A in functionality and performance with the exception that the Type B is a slave to the Type A and the Type A does the radar data processing for the Type B.

The Type U Sensor is an ultrasonic sensor that is slaved to a Type A radar sensor. The Type U sensor is primarily intended for use on the rear of a vehicle, where accurate range information is valuable to assist the driver while backing the vehicle. Type U sensors are always used in conjunction with radar sensors so that if environmental conditions exists which impair the performance of the ultrasonic sensor (heavy dirt or ice coating, very strong wind, or very heavy rain or snow), radar data can automatically be substituted for the ultrasonic data. When this automatic substitution takes place, an indication that the ultrasonic sensor is impaired is provided to the driver interface.

In one embodiment, the Type U sensor measures the range to any object equal to or larger than a 1" diameter pipe 3' long at a range of 6" to 12' behind the truck with an accuracy of +/−10% or +/−2" (whichever is greater). The range measurement tracks actual range within specification for vehicle speeds up to 5 mph. The range measurement tracks actual range with an accuracy of +/−20% for vehicle speeds of 5 mph to 15 mph.

In one embodiment, the Vehicle/Driver Interface (VDI) unit provides an interface between the sensor array and both the vehicle and the driver. The VDI unit reads vehicle information (speed, reverse, stop flashers) from the J1708 or J1939 data links on the vehicle and provides this information to the Type A sensors. The VDI unit also relays driver interface information from the Type A sensors to the J1708 or J1939 data links on the vehicle for use on vehicle-integrated driver interface systems. The VDI unit will drive up to two LED displays (e.g., mirrors 40 and 41) and one audio unit.

In one embodiment, the VDI unit operates from 12 VDC vehicle battery power, with protection circuits to protect the electronics from (1) surges due to an overcharging alternator, (2) reverse voltage, or (3) electrostatic discharge. In one embodiment, the VDI unit housing effectively seals against all environmental conditions, solvents, and sprays encountered on the exterior of a vehicle per SAE J1455. In one such embodiment, the VDI unit is certified to comply with SAE J1455 and with FCC requirements.

In one embodiment, the VDI unit is connectorized. Optional cables and harnesses designed to withstand the environmental conditions called out in SAE J1455 are available. Connectors utilize a locking mechanism, are environmentally sealed, and provide highly reliable electrical connections under continuous shock and vibration.

In one embodiment, the VDI unit provides a built-in-test function that detects a malfunction in itself or any of the optional driver interface units and passes this information on to the driver interface.

In one embodiment, stand-alone driver interface units (DIUs) include LED displays, digital readouts (future), and audible feedback units. These units provide flexible stand-alone configurations that result in high reliability and minimized cost.

In one embodiment, DIUs operate from power provided by the VDI unit. DIU housings intended for mounting on the exterior of the vehicle, effectively seal against all environmental conditions, solvents, and sprays encountered on the exterior of a vehicle per SAE J1455. In one such embodiment, DIUs are certified to comply with SAE J1455 and with FCC requirements.

In one embodiment, all DIU housings are connectorized (either directly or through a pre-attached connectorized cable). Optional cables and harnesses designed to withstand the environmental conditions called out in SAE J1455 are available. Connectors utilize a locking mechanism, are environmentally sealed, and provide highly reliable electrical connections under continuous shock and vibration.

In one embodiment, each DIU provides a built-in-test function that displays malfunctions detected in any of the sensors and passes this information on to the driver interface. All DIUs provide positive feedback to the driver that shows that they are fully functional every time the system is powered up. This includes lighting all display segments and exercising the audio unit in a pleasant distinctive manner. In one embodiment, if the power-up BIT functions detect a system failure, the audio unit is exercised in a less pleasant distinctive manner.

Figure 12:
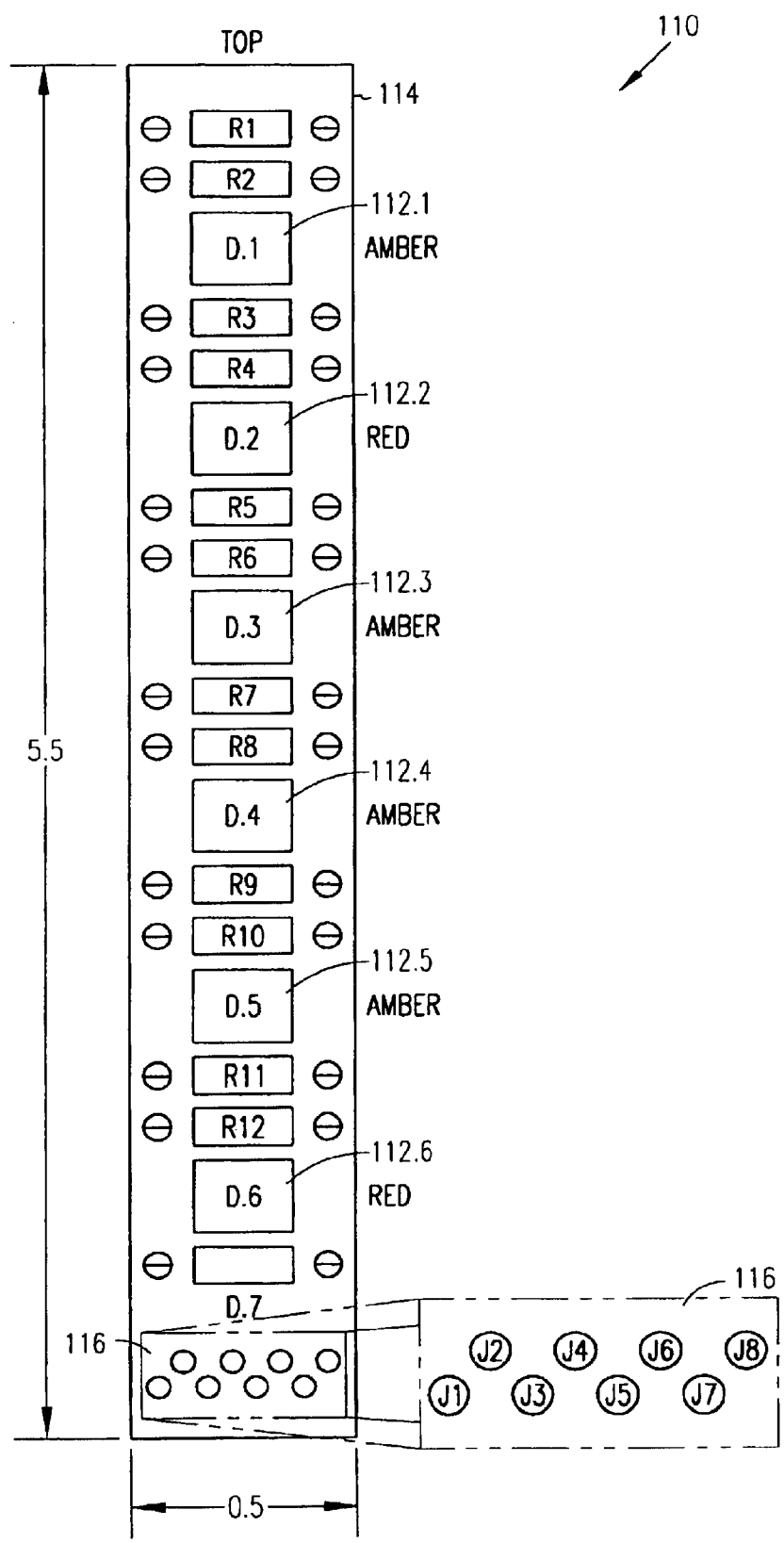
FIG. 12 illustrates a mirror-mounted display.

In one embodiment, a mirror-mount LED display (MLD) 110 provides visual feedback to the driver. In one embodiment, as is shown in FIG. 12, MLD 110 includes six LEDs (112.1 through 112.6) mounted vertically in a row, and intended to be mounted on the outside of each side mirror. MLD 110 is designed for viewing in a wide range of weather and lighting conditions. It can also be mounted inside the bus, on an A bar or on the dash. From the top, the LED functions are: LED 112.1 lights amber for system status, LED 112.2 lights red for side and front sensors, LEDs 112.3–5 light amber and LED 112.6 lights red, all for rear sensor 106. In one embodiment, spacing between the top 3 LEDs (LED 112.1–3) is slightly wider than the spacing between the bottom 4 LEDs (LED 112.3–6).

In one embodiment, LEDs 112 are mounted on a printed circuit board 114 and protected with a translucent top housing and an opaque bottom housing. Wire termination holes 16 are provided at the bottom of PCB 114. In one embodiment, PCB 114 is designed to draw heat away from LEDs 112.

In one embodiment, LED 112.1 is a system status indicator. In the normal state (no malfunctions) it turns on and off providing a 0.5 Hz heartbeat (75% duty cycle, off 250 ms, on 250 ms, off 250 ms, on 1250 ms). For abnormal conditions, LED 112.1 flashes at a 4 Hz rate for 1 minute at power-up and again for 1 minute at any time that an attempt is made to activate the failed circuitry, and remains off the rest of the time. It simply remains off all of the time for certain failure conditions that prevent LED 112.1 from flashing. A special abnormal condition is when the system detects that the ultrasonic sensors are not functioning correctly and range is coming from the radar sensors. In this case status light 112.1 flashes at 4 Hz for 1 second and then off for 1 second. This continues as long as there are objects detected by the radar sensors that should be picked up by the ultrasonic sensors, but are not.

LED 112.2 is a side and front object detection indicator. Left and right MLDs 110 are driven independently. For side object detection, LED 112.2 on MLD 110 on the side on which the object is detected flashes to indicate the detection. Ranges and flashing patterns can be customized, but the default is 1 Hz flashing for an object 4 to 8 ft from the bus and 4 Hz flashing for an object 0 to 4 ft from the bus. For front object detection, the performance is the same, but both left and right MLDs 110 flash in unison. If a single MLD 110 is used, LED 112.2 indicates that an object has been detected on the front or on either side. When in reverse, LED 112.2 can be used to indicate side object detection at a limited range. The default settings, when in reverse, are 2 to 4 fl for 1 Hz flashing and 0 to 2 ft for 4 Hz flashing.

Remaining LEDs 112.3–6 are rear range indicators. LEDs 112.3–5, along with LED 112.6, indicate the range to the nearest object detected to the rear of the bus when the bus is in reverse. The default pattern for rear range indication is as follows (where A1, A2 and A3 indicate LEDs 112.3, 4 and 5, respectively):

>20'__ scroll through rear range lights to indicate that system is in reverse mode and scanning to the rear: A1, A2, A3, red, A3, A2, A1, repeating, each on one at a time for 250 ms.

10' to 20'__ A, A2, A3, and red flashing at 2 Hz
5' to 10'__ A2, A3, and red flashing at 2 Hz
2' to 5'__ A3, and red flashing at 2 Hz
6" to 2'__ red flashing at 2 Hz
≦6"__ all 6 lights flashing at 4 Hz.

A sudden change in range, indicating that a moving object (child, bicycle, or vehicle) has suddenly moved into the path of the backing bus, will also result in all 6 lights flashing at 4 Hz.

Figure 13:
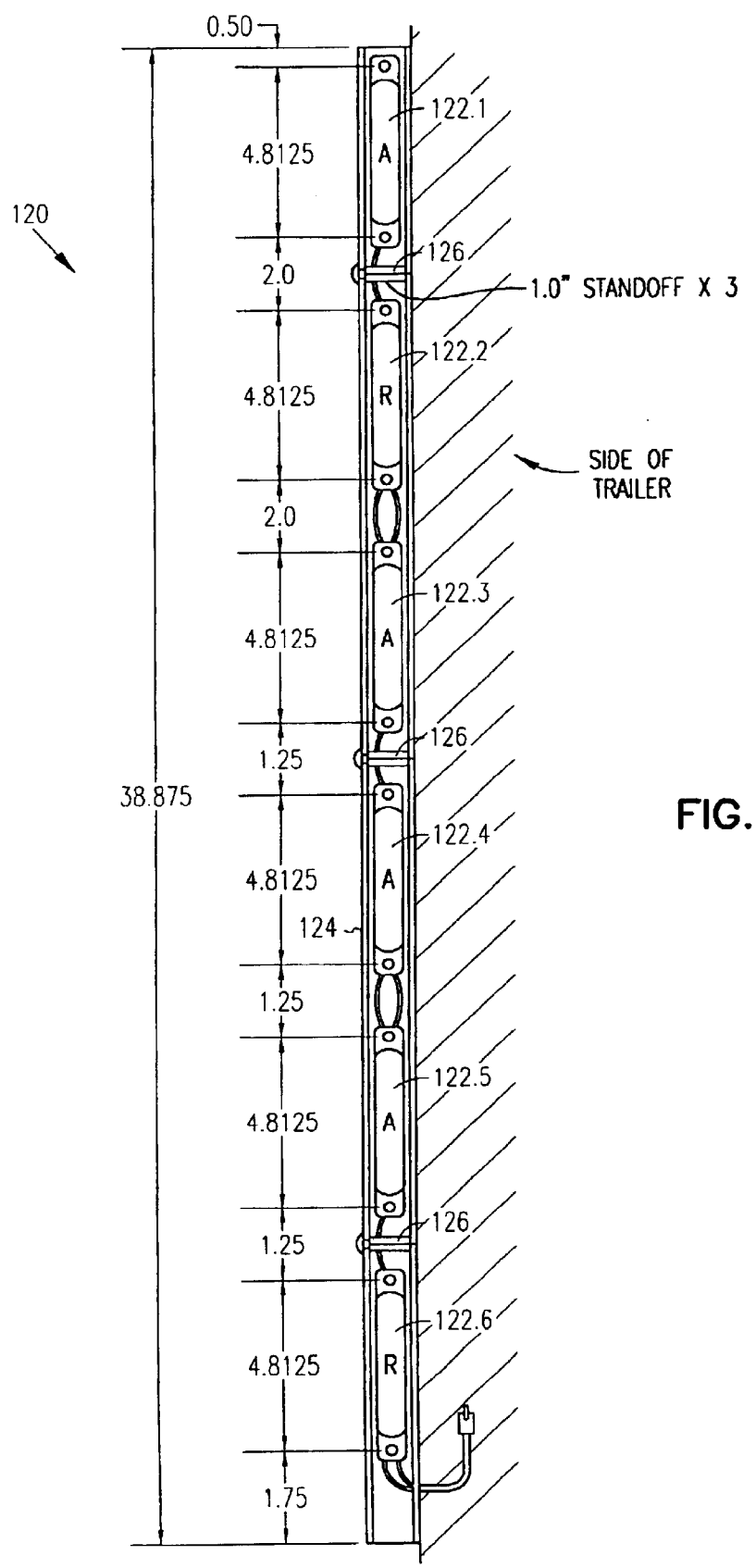
FIGS. 13 and 14 illustrate a side-mounted display.

In one embodiment, a side-mount LED display (SLD) 120 is used instead of MLD 110 to provide visual feedback to the driver. In one embodiment, as is shown in FIG. 13, SLD 120 includes six LED marker lights (LEDs 122.1 through 122.6) mounted vertically in a row, and intended to be mounted on the outside surface of the bus within the sight line of each side mirror. SLD 110 is designed for viewing in a wide range of weather and lighting conditions. It also can be mounted inside the bus, on an A bar or on the dash. From the top, the LED functions are: LED 122.1 lights amber for system status, LED 122.2 lights red for side and front sensors, LEDs 122.3–5 light amber and LED 122.6 lights red, all for rear sensor 106. In one embodiment, spacing between the top 3 LEDs (LED 112.1–3) is slightly wider than the spacing between the bottom 4 LEDs (LED 112.3–6).

In one embodiment, SLD 120 operates in a manner similar to MLD 10 described above.

Figure 14:
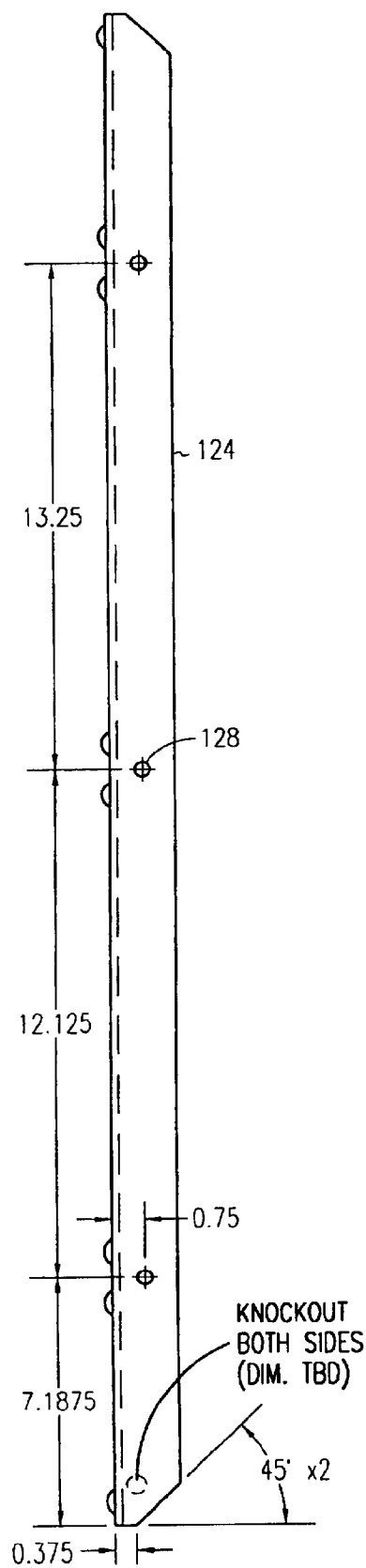

In one embodiment, LED marker lights 122 are mounted within an aluminum frame 124. Spacers 126 are situated as needed within frame 124. A side view of frame 124 (in FIG. 14) shows holes 128 for screwing frame 124 to the side of the vehicle.

In one embodiment, a Dash-Mount Audio Unit (DAU) provides audible feedback to the driver. The DAU housing is designed to fit into a standard circular knockout on the dashboard. It includes a single green LED to indicate that it is connected and getting power from the VDI unit. The DAU provides tones of varying pulse rate and pulse length to indicate the various alarms and range indications. The DAU is designed to be heard in the noisy environment of a school bus.

In one embodiment, the pulse patterns can be customized, but the default patterns are as follows:
Left side detection at 4 to 8 ft__Long/short 1 Hz pattern
Left side detection at 0 to 4 ft__ Long/short 2 Hz pattern
Right side detection at 4 to 8 ft__ Short/long 1 Hz pattern
Right side detection at 0 to 4 ft__ Short/long 2 Hz pattern
Front detection at 4 to 8 ft__ 3 short pulses, 1 Hz pattern
Front detection at 0 to 4 ft__ 3 short pulses, 2 Hz pattern
Rear detection at 10 to 20 ft__ 0.5 Hz 25% duty cycle pattern
Rear detection at 5 to 10 ft__ 1 Hz 50% duty cycle pattern
Rear detection at 2 to 5 ft__ 2 Hz 50% duty cycle pattern
Rear detection at 0.5 to 2 ft__ 4 Hz 50% duty cycle pattern
Rear detection at <0.5 ft__ steady tone.

In one embodiment, rear audible alerts continue as long as the bus is in reverse. Front and side audible alerts can be programmed to extinguish after a fixed period (eg., 4 seconds), while the visual alert continues, if conditions remain static. The audible alert restarts if conditions change (i.e., more movement than that provided by a parked car with its engine running).

In one embodiment, a system malfunction is indicated with an audible alert that consists of a continuous 4 pulses per second, lasting for 4 seconds. This occurs on power up and when the malfunction is first detected only. Detection of an ultrasonic sensor with degraded performance is indicated by an audible alert that consists of 4 pulses then 1 second rest, in sync with the status LED, repeated 2 times, whenever an object is picked up by the radar sensors that the ultrasonic sensor is missing.

In the above discussion, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A collision avoidance system for a vehicle, comprising:
   one or more transmitting devices disposed to transmit a first signal into a region adjacent a driver side of the vehicle;
   one or more receiving devices, wherein the one or more receiving devices receive return signals;
   a control module connected to the one or more transmitting devices and the receiving devices, wherein the control module detects a hazard based on information on the return signals received from the one or more receiving devices; and
   a mirror, wherein the mirror includes a visual indicator for displaying, in graphic form, a warning of the hazard detected by the control module.

2. The collision avoidance system of claim 1, wherein the mirror includes a visual indicator which activates when a hazard is detected in a direction and a turn signal is activated for movement in that direction.

3. The collision avoidance system of claim 2, wherein the visual indicator is a slash which extends on a diagonal across the mirror.

4. The collision avoidance system of claim 1, wherein the vehicle includes a transmission and wherein the mirror includes a visual indicator which activates when a hazard is detected behind the vehicle while the transmission is in reverse.

5. The collision avoidance system of claim 4, wherein the visual indicator is a triangle.

6. The collision avoidance system of claim 4, wherein the visual indicator is a triangle and line formed from discrete points and wherein the line is activated as a sequence of the discrete points.

7. The system according to claim 4, wherein the visual indicator is a triangle and line and wherein the control module divides the line into a plurality of zones, selects a zone from the plurality of zones and places an indication within the selected zone representative of distance to the hazard.

8. The collision avoidance system of claim 1, wherein the vehicle includes a passenger side, a front side and a rear side and further wherein the at least one transmitting devices is adapted to transmit the first signal into a region adjacent to the passenger side, a region adjacent the front side and a region adjacent the rear side.

9. The collision avoidance system of claim 1, wherein the vehicle includes a passenger side, a front side and a rear side and further wherein at least one transmitting device is adapted to transmit a second signal into a region adjacent the passenger side, at least one transmitting device is adapted to transmit a third signal into a region adjacent the front side, and at least one transmitting device is adapted to transmit a fourth signal into a region adjacent the rear side.

10. A method of alerting a driver of potential hazards, comprising:
    detecting a potential collision event using a transmitted signal and a reflected signal based on the transmitted signal, wherein the transmitted signal is directed into one or more regions about a vehicle and at least one region includes a region adjacent a driver side of the vehicle; and
    displaying, in graphical form, a symbol within a mirror indicating that the potential collision event has been detected.

11. The method of claim 10, wherein detecting a potential collision event includes transmitting a signal, detecting a reflection of the signal and determining presence of an object based on the reflection.

12. The method of claim 10, wherein detecting a potential collision includes transmitting a plurality of signals into a plurality of regions adjacent the vehicle.

13. A collision avoidance system for a vehicle, comprising:
    a plurality of transmitting devices, including a first transmitting device and a second transmitting device, wherein the first transmitting device is adapted to transmit a first signal into a region adjacent a driver side of the vehicle and the second transmitting device is adapted to transmit a second signal;
    a plurality of receiving devices, including a first receiving device and a second receiving device, wherein the first receiving device receives a return representative of the signal transmitted from the first transmitting device and transmits a first return signal representative of the first return and wherein the second receiving device receives a return representative of the signal transmitted from the second transmitting device and transmits a second return signal representative of the second return;
    a control module connected to the plurality of transmitting devices and the plurality of receiving devices, wherein the control module receives the first and second return signals and detects potential hazards as a function of the first and second return signals; and
    a mirror, wherein the mirror a visual indicator for displaying, in graphic form, a warning of potential hazards detected by the control module.

14. The collision avoidance system of claim 13, wherein the mirror includes a visual indicator which activates when a hazard is detected in a direction and a turn signal is activated for movement in that direction.

15. The collision avoidance system of claim 14, wherein the visual indicator is a slash which extends on a diagonal across the mirror.

16. The collision avoidance system of claim 13, wherein the mirror includes a visual indicator which activates when a hazard is detected behind the vehicle while the transmission is in reverse.

17. The collision avoidance system of claim 16, wherein the visual indicator is a triangle.

18. The collision avoidance system of claim 16, wherein the visual indicator is a triangle and line formed from discrete points and wherein the line is activated as a sequence of the discrete points.

19. The system according to claim 16, wherein the visual indicator is a triangle and line and wherein the control module divides the line into a plurality of zones, selects a zone from the plurality of zones and places an indication within the selected zone representative of distance to the hazard.

20. The collision avoidance system of claim 13, wherein the second transmitting device is adapted to transmit the second signal into a region adjacent a side of the vehicle.

21. The collision avoidance system of claim 13, further including:
- a third transmitting device adapted to transmit a third signal into a region adjacent a rear portion of the vehicle;
- a fourth transmitting device adapted to transmit a fourth signal into a region adjacent a front portion of the vehicle;
- a third receiving device coupled to the control module and adapted to receive a return representative of the signal transmitted from the third transmitting device and transmits a third return signal representative of the third return; and
- a fourth receiving device coupled to the control module and adapted to receive a return representative of the signal transmitted from the fourth transmitting device and transmits a fourth return signal representative of the fourth return; and
- wherein the control module receives the third and fourth return signals and detects a potential hazard as a function of the third or fourth return signal.

* * * * *